J. W. FAHNESTOCK.
FRUIT GATHERER.
APPLICATION FILED DEC. 29, 1908.
925,885.
Patented June 22, 1909.
2 SHEETS—SHEET 1.
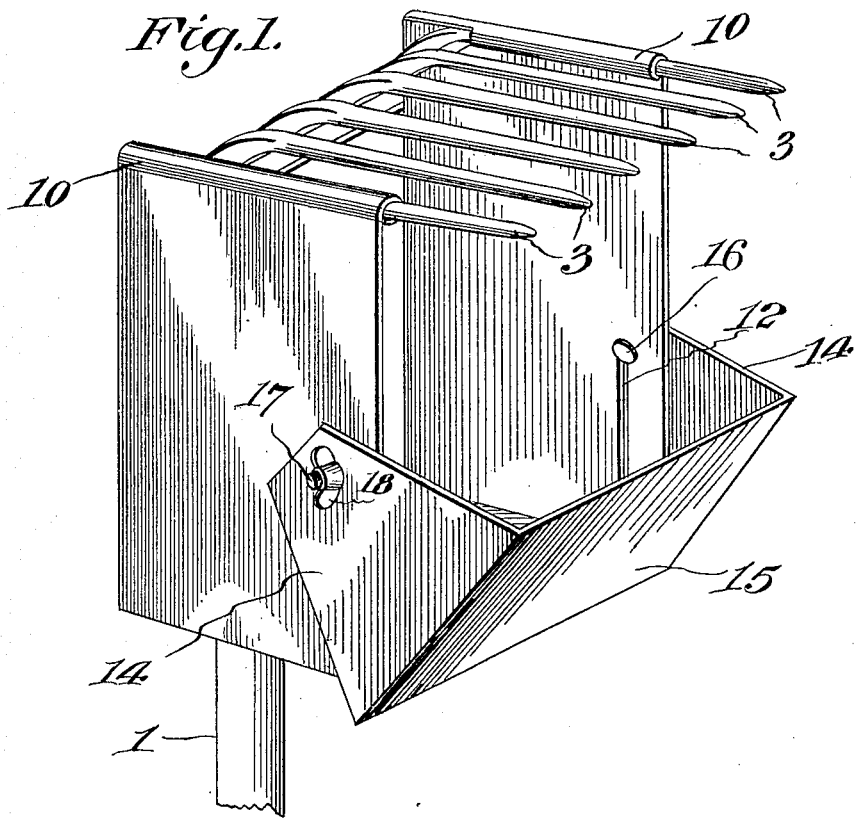
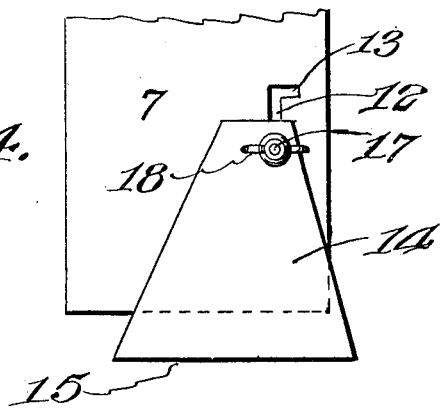
Inventor
John W. Fahnestock
By Victor J. Evans,
Attorney
Witnesses:
Joe. P. Wahler

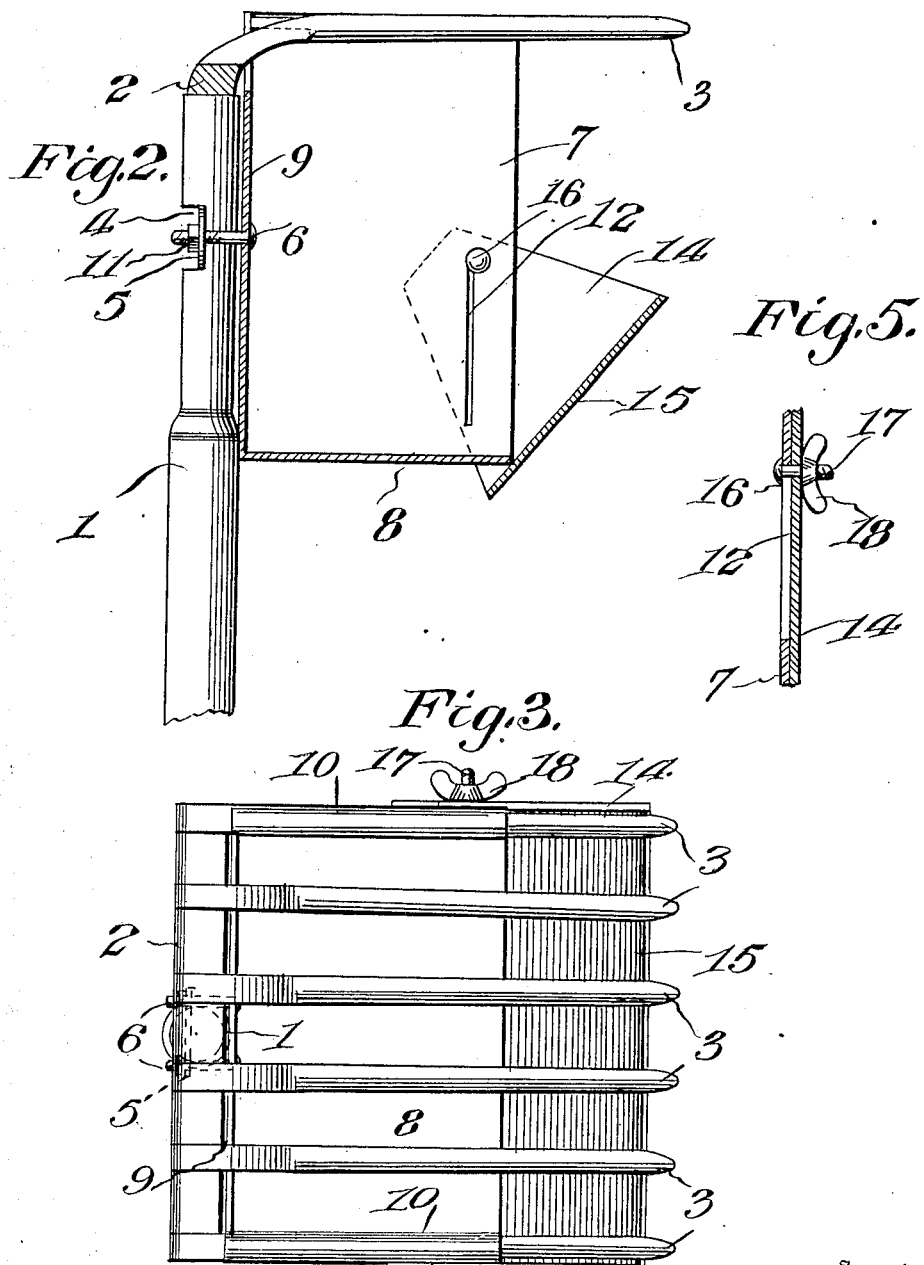

UNITED STATES PATENT OFFICE.

JOHN W. FAHNESTOCK, OF EAST GREENSBURG, PENNSYLVANIA.

FRUIT-GATHERER.

No. 925,885.  Specification of Letters Patent.  Patented June 22, 1909.

Application filed December 29, 1908. Serial No. 469,743.

*To all whom it may concern:*

Be it known that I, JOHN W. FAHNESTOCK, a citizen of the United States of America, residing at East Greensburg, in the county of Westmoreland and State of Pennsylvania, have invented new and useful Improvements in Fruit-Gatherers, of which the following is a specification.

This invention relates to fruit gatherers, and one of the principal objects of the same is to provide simple and efficient means to prevent the fruit from falling to the ground after it has been picked by the fingers of the picker.

Another object of the invention is to provide means for readily discharging the contents of the box or container for the fruit after it has been picked.

These and other objects may be attained by means of the construction illustrated in the accompanying drawings, in which,—

Figure 1 is a perspective view of a fruit picker made in accordance with my invention. Fig. 2 is a vertical section through the head of the picker. Fig. 3 is a top plan view of the same. Fig. 4 is a detail view, showing the manner of adjusting the guard and spout in elevation. Fig. 5 is a detail sectional view, showing the means for adjusting the combined guard and spout.

Referring to the drawing, the numeral 1 designates the handle of the implement, said handle being provided with a cross bar 2 at its upper end. A series of picking fingers 3 project at right angles from the cross bar 2. The handle 1 near its upper end is provided with a recess 4 to accommodate a plate 5 through which the screw bolts 6 for connecting the box or receiver 7 pass. The box 7 is provided with a bottom 8, a back wall 9 and the two sides which are curled inwardly at 10 around the outer finger 3 of the picker. To hold the box or container in position the bolts 6 have nuts 11 applied thereto, as shown in Fig. 2 of the drawing. The box or container 7 is provided with oppositely disposed vertical slots 12, said slots having angular branches 13 at their upper ends.

The combined guard and discharge spout comprises the two sides 14 and the bottom 15 which connects the two sides. A bolt 16 extends through the slot 12 and through one of the sides 14 of the guard and spout, while at the opposite side a similar bolt 17 extends through the slot 12 and is provided with a winged nut 18 for holding the guard and spout in adjusted position.

From the foregoing it will be obvious that when the guard is adjusted as shown in Figs. 1 and 2 of the drawing, it will prevent the fruit from dropping out of the container 7, and that when the guard is adjusted, as shown in Fig. 4, the container may be readily discharged of its contents. The guard 14 may be adjusted to form a discharge chute for discharging the fruit into barrels or bags, if so desired.

I claim:—

1. A fruit picker comprising a handle, a series of fingers extending outward from the handle, a box or container secured to the handle and to the fingers, and a combined guard and spout adjustably connected to the container.

2. A fruit picker comprising a handle, a series of fingers extending outward from the handle, a container for the fruit, said container being secured to the handle and connected to the side fingers by bending the metal of the container over said fingers, and a guard and spout adjustably connected to the container.

3. A fruit picker comprising a handle, a series of fingers projecting from the handle, a box or container, means for securing the same to the handle and to the fingers, and a guard and spout adjustably connected to the sides of the container by means of slots formed in the sides of the container, and a threaded bolt and winged nut for holding the guard in adjusted position.

In testimony whereof I affix my signature in presence of two witnesses.

JOHN W. FAHNESTOCK.

Witnesses:
R. W. AMALONG,
A. STRASLICKA.